(12) United States Patent
Liles et al.

(10) Patent No.: US 6,601,019 B1
(45) Date of Patent: Jul. 29, 2003

(54) SYSTEM AND METHOD FOR VALIDATION OF OBJECTS

(75) Inventors: Daniel T. Liles, Loveland, CO (US); Darvin D. Raph, Loveland, CO (US); Ed O. Schlotzhauer, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/441,682

(22) Filed: Nov. 16, 1999

(51) Int. Cl.[7] .................................................. G06F 9/46
(52) U.S. Cl. ...................................... 702/186; 702/181
(58) Field of Search ............................ 73/118.1; 371/20; 395/183.14, 185.07, 704, 705, 575; 700/1, 28, 32, 78, 79, 86, 89; 717/101, 114, 116, 124, 126; 702/121, 127, 182, 183, 186, 123

(56) References Cited

U.S. PATENT DOCUMENTS

| | | | | |
|---|---|---|---|---|
| 4,707,834 A | * | 11/1987 | Frisch et al. | 371/20 |
| 5,265,468 A | * | 11/1993 | Holst et al. | 73/118.1 |
| 5,390,325 A | * | 2/1995 | Miller | 395/575 |
| 5,490,249 A | * | 2/1996 | Miller | 395/183.14 |
| 5,651,111 A | * | 7/1997 | McKeeman et al. | 395/183.14 |
| 5,740,441 A | * | 4/1998 | Yellin et al. | 395/704 |
| 5,748,964 A | * | 5/1998 | Gosling | 395/705 |
| 5,768,502 A | * | 6/1998 | Ikushima et al. | 395/185.07 |
| 5,999,731 A | * | 12/1999 | Yellin et al. | 395/704 |
| 6,075,940 A | * | 6/2000 | Gosling | 395/704 |
| 6,438,512 B1 | * | 8/2002 | Miller | 702/186 |

* cited by examiner

*Primary Examiner*—John Barlow
*Assistant Examiner*—Douglas N Washburn (57) ABSTRACT

A system and method are provided for validating a number of objects in a software application such as a testing system. The system comprises a processor and a memory that are electrically coupled to a local interface that may comprise, for example, a data bus and associated control bus. Stored on the memory and executed by the processor is a software application that includes validation logic. Broadly stated, the validation logic includes logic to detect at least one actual problem in an object of the software application, and logic to display at least one problem indication corresponding to the at least one actual problem in a context of the object.

20 Claims, 10 Drawing Sheets

SYSTEM AND METHOD FOR VALIDATION OF OBJECTS

TECHNICAL FIELD

The present invention is generally related to the field of computer programs and, more particularly, is related to a system and method for validation of objects in a system such as, for example, a testing system.

BACKGROUND OF THE INVENTION

In many manufacturing settings, there is often a need to measure parameters on a repetitive basis. This may occur, for example, when measuring the quality of items produced on an assembly line or controlling certain variables germane to a particular manufacturing process, etc. Currently, it is often the case that digital computing systems are employed to control the hardware that performs such tasks.

The digital systems may employ, for example, standard programming languages to control the operation of the various hardware components of a testing system. In many cases, certain subroutines or objects are employed to communicate with and to control the various components. These objects may be reusable, if the same hardware components are employed in subsequent applications. There are generally many different programming languages that may be employed to create such objects.

Currently, systems may employ standardized execution systems that can control the execution of a number of objects such as, for example, tests in a testing system according to a particular order, where the testing systems actually enable the operation of the objects or tests at predetermined times. Such testing system may be quite complex using a multitude of individual tests to interface with a multitude of hardware components.

Because of this complexity, when programming such testing systems and other software applications of similar scope, it is generally commonplace that mistakes are made in the various objects such as the tests or actions. The mistakes may be, for example, the misuse of variables, misnaming variables or executable files, etc. Currently, the programmer does not see such mistakes until the programming of a particular object is complete and it fails to operate properly due to the mistakes.

SUMMARY OF THE INVENTION

In light of the forgoing, the present invention provides for a system and method for validating an object in a software application such as a testing system. By way of providing an illustration, the testing system comprises, for example, a test executive program that enables the operation of a number of objects called "tests" according to a particular sequence.

According to one embodiment, the system comprises a processor and a memory that are electrically coupled to a local interface that may comprise, for example, a data bus and are associated control bus. Stored on the memory and executed by the processor is application software such as test executive software that includes validation logic. Broadly stated, the validation logic includes logic to detect at least one actual problem in an object of the exemplary test executive software, and logic to display at least one problem indication corresponding to the at least one actual problem in a context of the object in which the problem occurs. The validation logic includes other specific functionality as will be discussed below.

In another embodiment, the present invention may be viewed as a method for object validation, comprising the steps of: detecting at least one actual problem in an object, and displaying at least one problem indication corresponding to the at least one actual problem in a context of the object. The present invention also includes further steps as will be discussed below.

The present invention provides a distinct advantage in that a user is informed of problems with various objects as they are created before the software is executed and experiences a failure. As a result, troubleshooting time that is necessary to find mistakes and problems in various objects is reduced accordingly.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
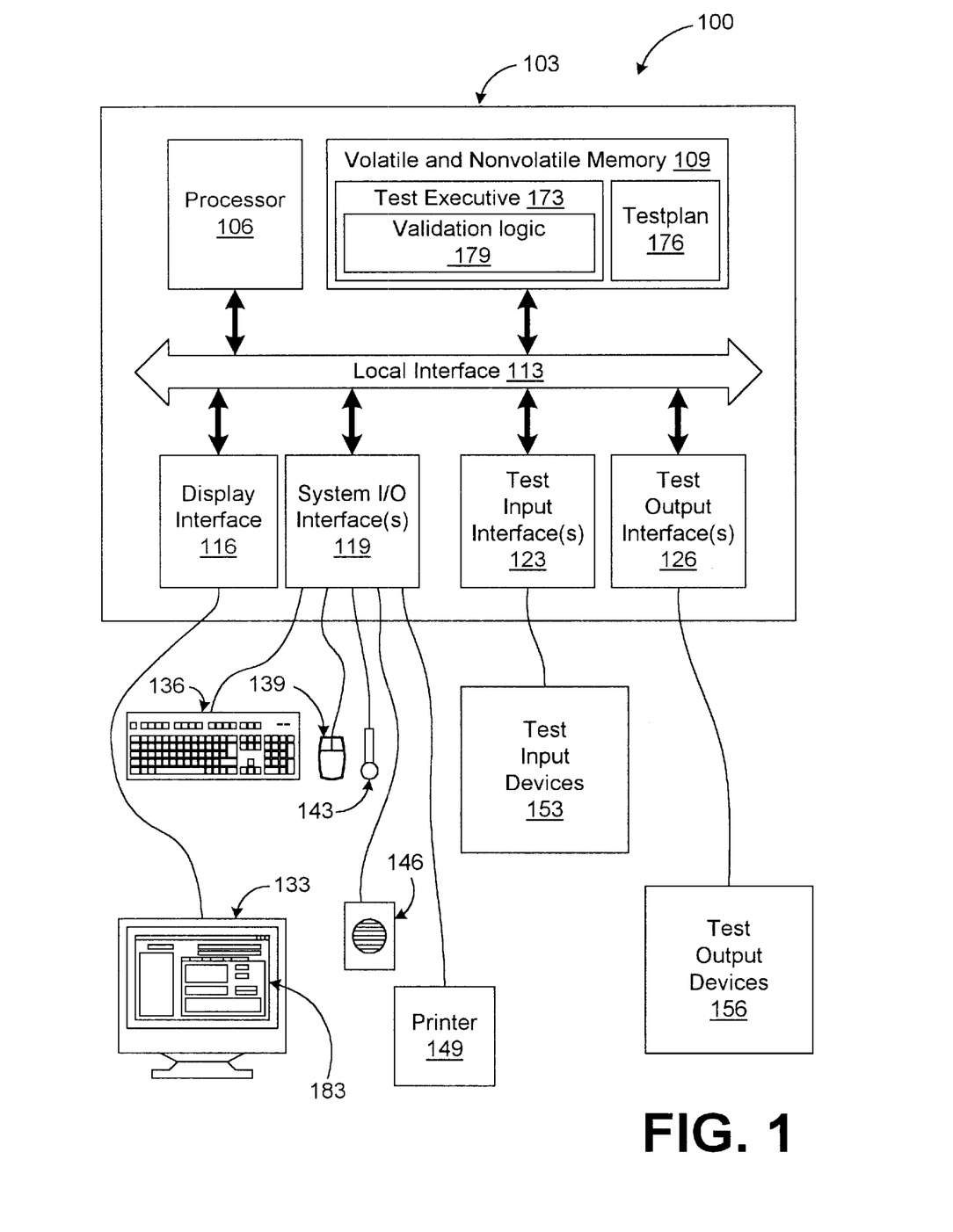
FIG. 1 is a block diagram of an exemplary testing system according to an embodiment of the present invention.

Turning to FIG. 1, shown is a testing system 100 according to embodiment (a nonlimiting example) of the present invention. The testing system 100 includes a computer system 103 that is linked to a number of input and output (I/O) devices. The computer system 103 includes a processor 106 and a memory 109 that are both electrically coupled to a local interface 113. The local interface 113 is comprised of, for example, a data bus and an associated control bus. The memory 109 includes both volatile and nonvolatile memory components. Volatile components are those that do not retain data values upon loss of power. Conversely, nonvolatile components retain data upon a loss of power. The memory 109 may include for example, random access memory (RAM), read only memory (ROM), hard disk drives, floppy disk drives, compact disk drives, tape drives, and other memory components.

Also electrically coupled to the local interface 113 are a display interface 116 and system input/output interfaces 119. In addition, the computer system 103 includes test input interfaces 123 and test output interfaces 126. The display interface 116 links an appropriate display device 133 to the local interface 113 thereby enabling the processor 106 to cause appropriate displays on the display device 133 pursuant to operating system logic as will be discussed. The display device 133 may comprise, for example, a cathode ray tube (CRT), a liquid crystal display screen, a gas plasma-based flat panel display, indicator lights, light emitting diodes, and other display devices.

The testing system 100 also includes a number of input devices, namely a keyboard 136, a mouse 139, or a microphone 143 or other like devices. The testing system 100 also comprises output devices such as speakers 146 and/or a printer 149. Other input and output devices may be employed as known in the art. The system input/output interfaces 119 provides access by the input and output devices to and from the local interface 113 as known in the art.

The testing system 100 also includes one or more test input devices 153 that are linked to the local interface 113 via the test input interface(s) 123. Likewise, the testing system 100 includes one or more test output devices 156 that are linked to the local interface 113 via the test output interface(s) 126. The test input devices 153 may include any number of devices such as bar code readers, digital limit switches, buttons, instrumentation such as volt meters, power supplies, waveform generators, oscilloscopes, etc., and other devices. Likewise, the test output devices 156 may include any number of devices, including line printers, displays, indicators, etc.

The testing system 100 also includes test executive software 173 that is stored on the memory 109 and executed by the processor 106. Also stored on the memory 109 are one or more test plans 176 that are created using the test executive 173 and that ultimately guide the manipulation of the test input and output devices 153 and 156. The test executive software 173 includes validation logic 179 that performs a troubleshooting task to determine existence of problems in the one or more objects of the test plans 176 as will be discussed. In the context of the testing system 100, the objects are, for example, tests in the test plans 176. However, it is understood that the validation logic 179 is applicable to validate objects in software applications beyond the test system 100 as will be discussed, where the test system provides an example of a software application to illustrate the functionality of the validation code 179. The test executive software 173 also causes graphical user interfaces 183 to appear on the display device 133 in response to appropriate user input via the input devices 136, 139, or 143, etc., as is the case with other software applications.

Figure 2:
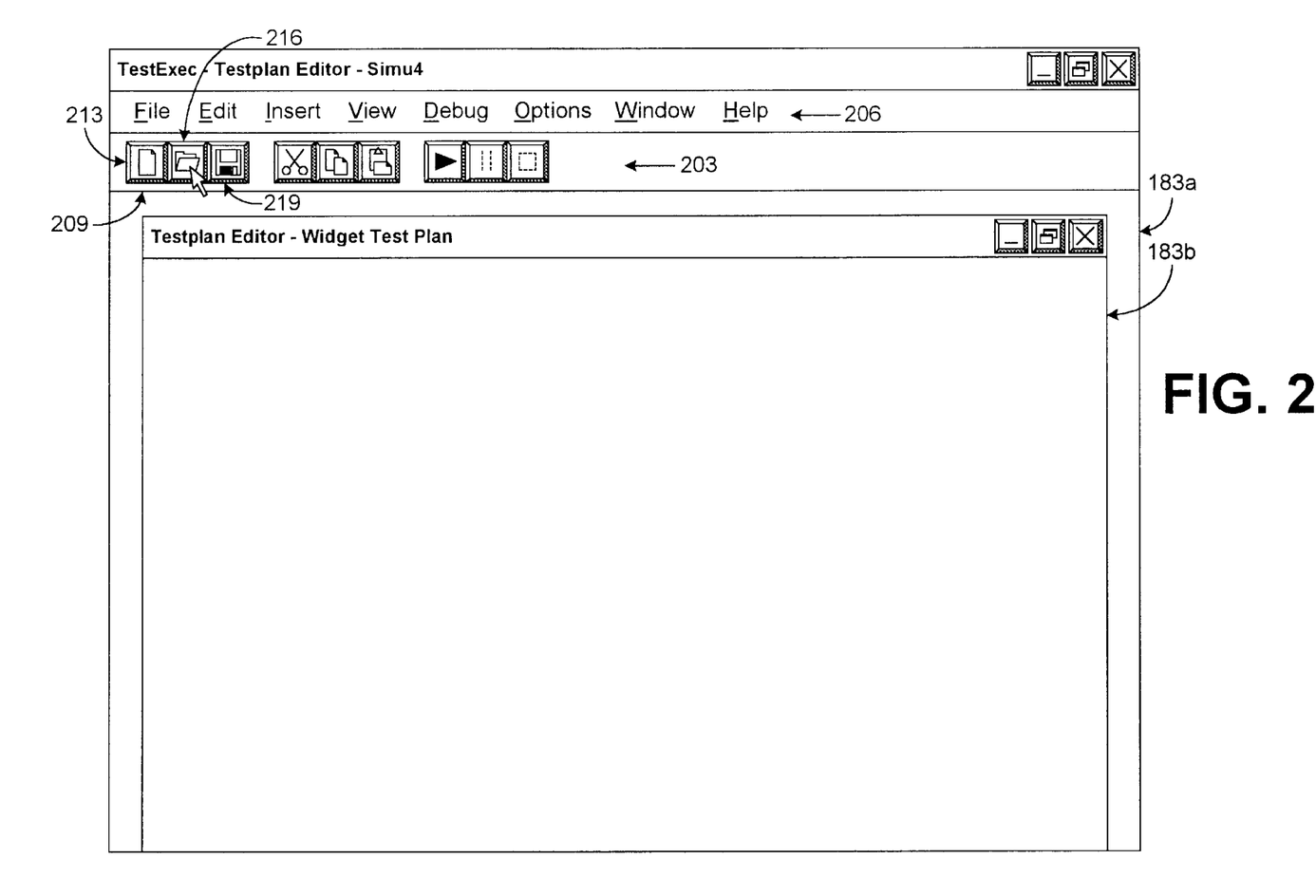
FIG. 2 is a drawing of a test executive user interface employed in the testing system of FIG. 1.

With reference then to FIG. 2, shown is a test executive user interface 183a according to an embodiment of the present invention. The test executive user interface 183a includes a number of push buttons 203 and a number of menu list items 206. The user may manipulate either the push buttons 203 or the menu items 206 by "clicking" on (or selecting) the particular button 203 or menu item 206. One "clicks" on such items by maneuvering a cursor 209 with the mouse 139 (FIG. 1), for example, and then pushing an appropriate button on the mouse 139. In particular, the user may create a new test plan by clicking on the blank page button 213 or may open an existing test plan by clicking on the open file button 216. Existing test plans may be saved by clicking on the save button 219. Also shown is a test plan editor interface 183b which has been opened as shown.

Note, however, before a particular test plan is created to perform a particular task such as, for example, testing items on an assembly line or other similar context, the hardware that makes up the test input devices 153 (FIG. 1) and test output devices 156 (FIG. 1) is specified using other graphical user interfaces not discussed herein. This is generally termed identifying the equipment topology associated with a particular test for which the testing system 100 is to be employed. Once all of the hardware is identified, the test executive software 173 allows the user to generate a test plan that manipulates the hardware in some manner. The particular details of the manipulation of the test input and output devices 153 and 156 is not discussed herein as such is well known by those skilled in the art.

Figure 3:
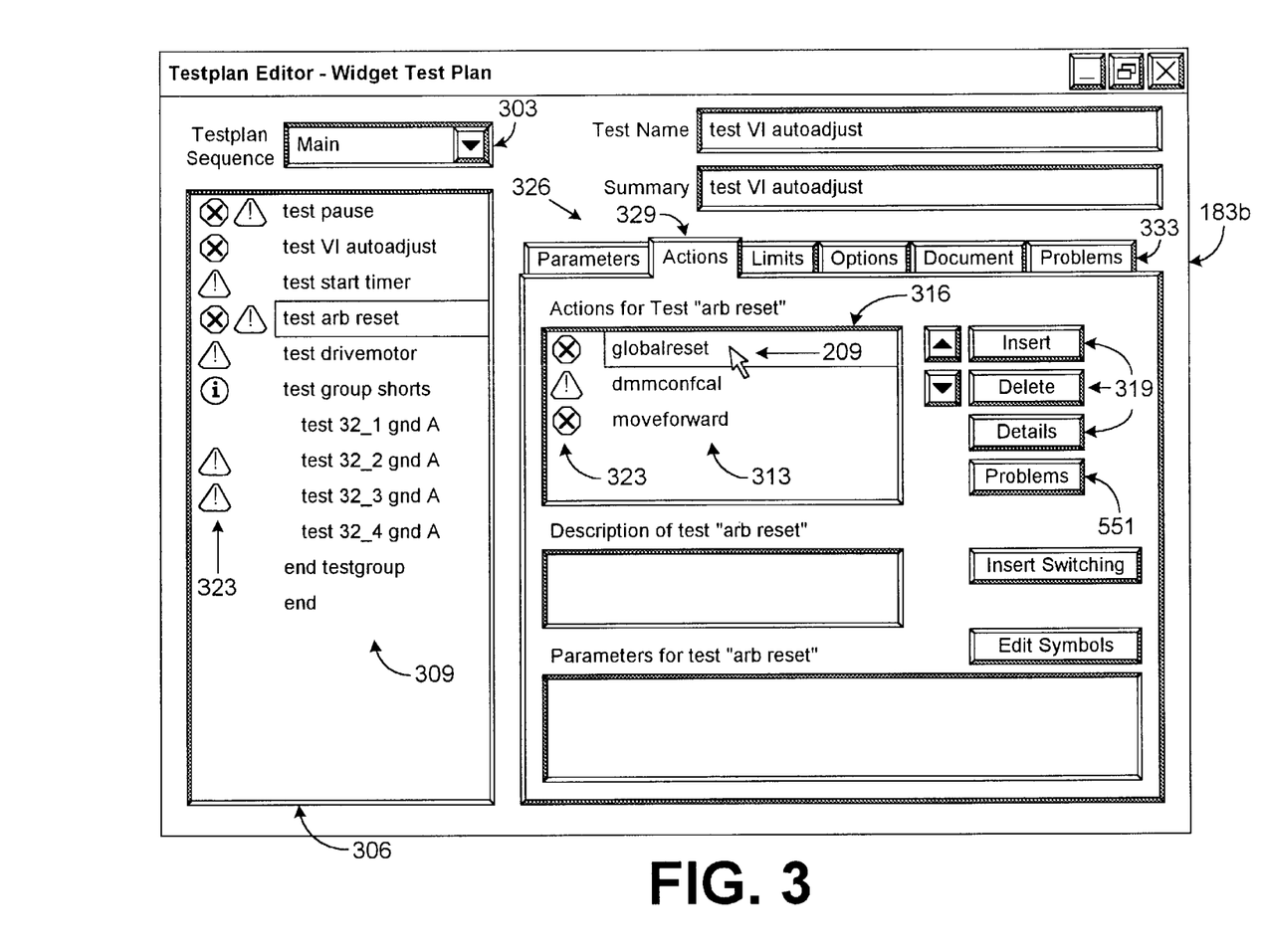
FIG. 3 is a drawing of a test plan editor interface employed in the testing system of FIG. 1.

Turning then to FIG. 3, shown is the test plan editor interface 183b according to another embodiment of the present invention. A particular test plan may involve a number of test plan sequences that are identified by the test plan sequence indicator 303. The particular test plan sequence identified by the test plan sequence indicator 303 is displayed in the test sequence indication window 306. The test plan sequence comprises a number of tests 309 that are executed. A single test 309 may comprise one or more actions 313.

According to an embodiment of the present invention, the tests 309 and the actions 313 are examples of "objects." The term "object" as discussed herein is defined as code that is treated as a discrete entity in a software application. The validation logic 179 (FIG. 1) operates on objects in the general sense, where the tests and actions are cited herein as examples of the objects.

The actions 313 generally manipulate the test input and output devices 153 and 156 according to a particular programming language. For example, the actions may be programmed in languages such as C, C++, Basic, or other like programming languages. The actions generally comprise the programmed control of the test output devices 156 based upon inputs from the test input devices 153 during the execution of a particular test plan. The use of the actions as such provides significant advantage in that they are reusable for other applications as well once they have been coded. Thus, when executing a particular test plan, the testing system 100 executes the particular tests 309 by executing the corresponding actions 313 that are assigned thereto.

The user may manipulate the cursor 209 over a particular test 309 and click thereon to highlight that particular test 309. When this occurs, the corresponding actions 313 that make up the highlighted test are illustrated in the action window 316. Likewise, the user may click on a particular action 313 to manipulate it in some particular way using the insert, delete, and details buttons 319 as shown. The functionality of these buttons is not discussed in detail herein, where one skilled in the art generally understands the operation thereof. Also shown on the test plan editor interface 183b are a number of problem indicators 323. The problem indicators 323 may appear in both the test sequence indication window 306 and the action window 316 along side the particular test 309 and/or action 313 in which the problem occurs. The problem indicators 323 advantageously inform the user that the problem exists with the particular test 309 or action 313. The test plan editor user interface 183b also includes a number of tabs 326 that are activated when the user clicks thereon. The tabs 326 include an action tab 329 and a problems tab 333. The action tab 329 is currently active as shown. Although other tabs 326 are shown, they are not discussed in detail herein. The view afforded when the user clicks on the problems tab 333 is discussed with reference to FIG. 5.

Figure 4A:
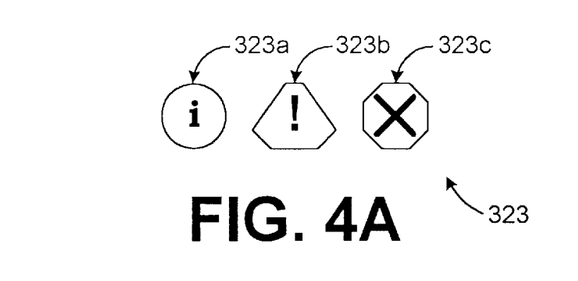
FIG. 4A is a drawing of three different problem indicators employed in the testing system of FIG. 1.

Turning then to FIG. 4A, shown are the problem indicators 323 according to an embodiment of the present invention. The problem indicators 323 include an informational indicator 323a, a warning indicator 323b, and an error indicator 323c. The informational indicator 323a generally tells the user useful information regarding a particular test 309 (FIG. 3) and/or action 313 (FIG. 3). The warning indicator 323b generally provides more critical information to the user regarding the tests 309 and/or the actions 313. In particular, the warning indicator 323b may inform the user that certain limits are exceeded, etc. For example, one may specify an output voltage for a power supply that is greater than the capabilities of the power supply. Finally, the error indicator 323c indicates circumstances in the tests 309 and/or actions 313 that prevent the testing system 100 from operating. Thus, any errors in a test plan executed by the testing system 100 will generally stop the operation of the test plan unless a remedy is specified as will be discussed.

Referring back to FIG. 3, the validation logic 179 (FIG. 1) includes a library of potential problems that are associated with the hardware components that are included in the testing system 100 during the identification of the equipment topology. To explain further, the hardware components comprise the test input devices 153 and test output devices 156 that are controlled by the actions 313 pursuant to the tests 309 that are created in a particular test plan. The various actions 313 identified as well as the tests 309 that are created may experience any one of a number of potential problems based upon the nature of the particular test 309, action 313, and/or the test input and output devices 153 and 156. The potential problems may be preprogrammed into the validation logic 179 and are automatically identified as potential problems based upon the test input and output devices 153 and 156. In addition, the user may also enter new potential problems based upon unique test input and output devices 153 and 156 that are employed with the testing system 100.

When the user creates the test plan comprising a number of tests 309 that trigger a number of actions 313, the validation logic 179 detects problems in those tests 309 and actions 313. In particular, the validation logic 179 examines the tests 309 and actions 313 to find the occurrence of any one of the potential problems that are associated with the specified test input and output devices 153 and 156. If one of the potential problems exists in a particular test 309 or action 313, the validation logic 179 will cause an appropriate problem indicator 323 to appear on the test plan editor interface 183b next to the appropriate test 309 and/or action 313. The placement of the problem indicators 323 next to the appropriate test 309 and action 313 provides context for where the problem exists in the particular test plan. Note that the problems discovered by the validation logic 179 when examining the tests 309 and/or actions 313 for the potential problems are labeled "actual problems" herein. Thus, a particular type of potential problem may exist in more than one test 309 and/or action 313. Thus, a specific potential problem may correspond with one or more actual problems.

Figure 4B:
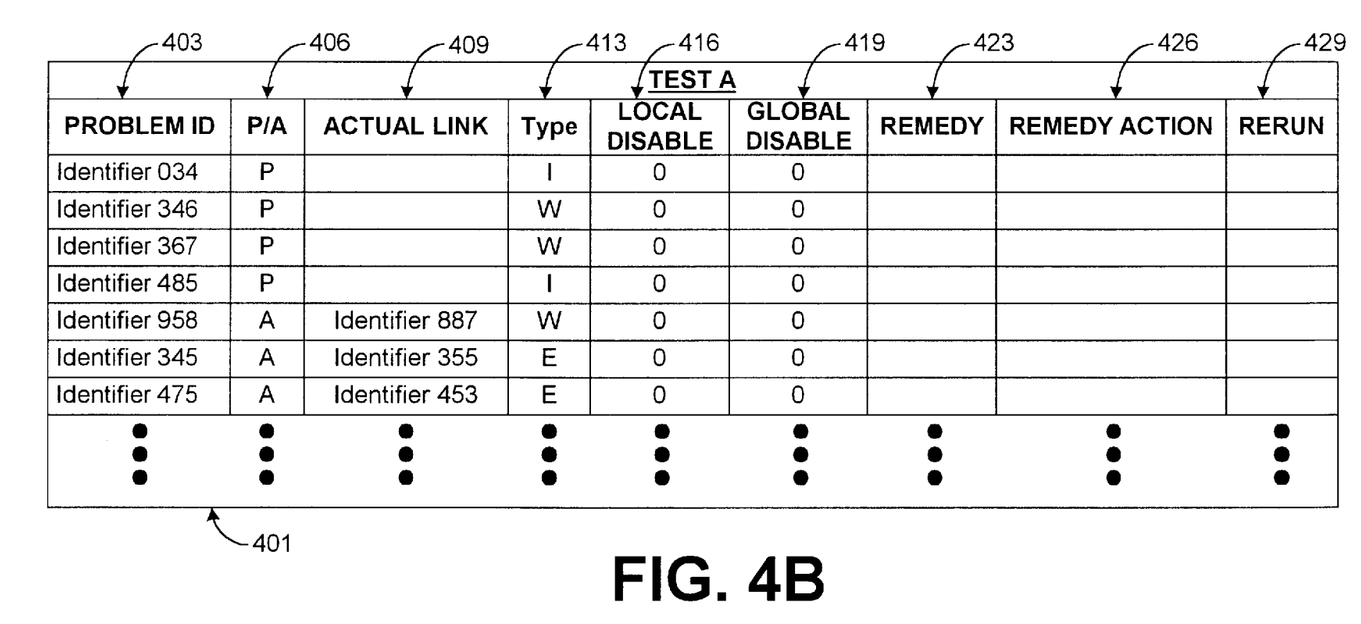
FIG. 4B is a test validation table of potential and actual problems associated with a particular object executed in the testing system of FIG. 1.

With this in mind, reference is made to FIG. 4B which illustrates a test validation table 401 according to another embodiment of the present invention. The test validation table 401 provides a mechanism by which the validation logic 179 keeps track of the potential and actual problems linked with a particular test 309 and the actions 313 associated therewith. Each potential and actual problem that are associated with a particular test 309 have a unique problem identifier 403. The potential and actual problems are listed in the test validation table 401 using the particular problem identifier 403 as the unique variable upon which all other information relating to the particular potential problem or actual problem is associated.

Next to the problem identifiers are potential/actual problem type flags 406 that indicate whether the particular problem is a potential problem or an actual problem. A "P" indicates a potential problem whereas an "A" indicates an actual problem. Next is an actual link field 409 that indicates the potential problem that corresponds with the actual problem. The actual link field 409 is employed for actual problems only, and is empty for all potential problems. An additional field is the problem type field 413 that indicates the particular type of problem, whether it be informational, warning, or error.

The test validation table also includes a local disable field 416 and a global disable field 419. The local and global disable fields 416 and 419 each hold a bit that can be a logical "0" or a logical "1" that indicates whether a particular problem is "disabled." When a problem is disabled, a corresponding problem indicator 323 (FIG. 3) does not appear on the test plan editor interface 183b (FIG. 3). In this manner, the user can illuminate any problem indicators 323 when desired to make the appearance of the test plan on the test plan editor interface 183 easier to view at desired times and to isolate the indication of specific problems.

Next to the global disable field 419 is the remedy field 423 that includes a variable that indicates a particular remedy that the testing system 100 is to employ upon the occurrence of the problem itself. The particular remedies that are indicated by the remedy field 423 will be discussed with reference to later figures. Next is a remedy action field 426 that indicates one or more actions that are executed upon an occurrence of the problem based upon the remedy chosen in the remedy field 423. Finally, a re-run field 429 is included that determines how many times the particular remedy action of the remedy action field 426 is performed.

The test validation table 401 is generated for each test 309 at the time the user creates the test 309 itself. Upon the creation of the test validation table 401, the validation logic 179 will automatically place default settings into the various fields for each problem listed therein. Thereafter, the user may change these settings my manipulating various mechanisms as will be discussed.

Figure 5:
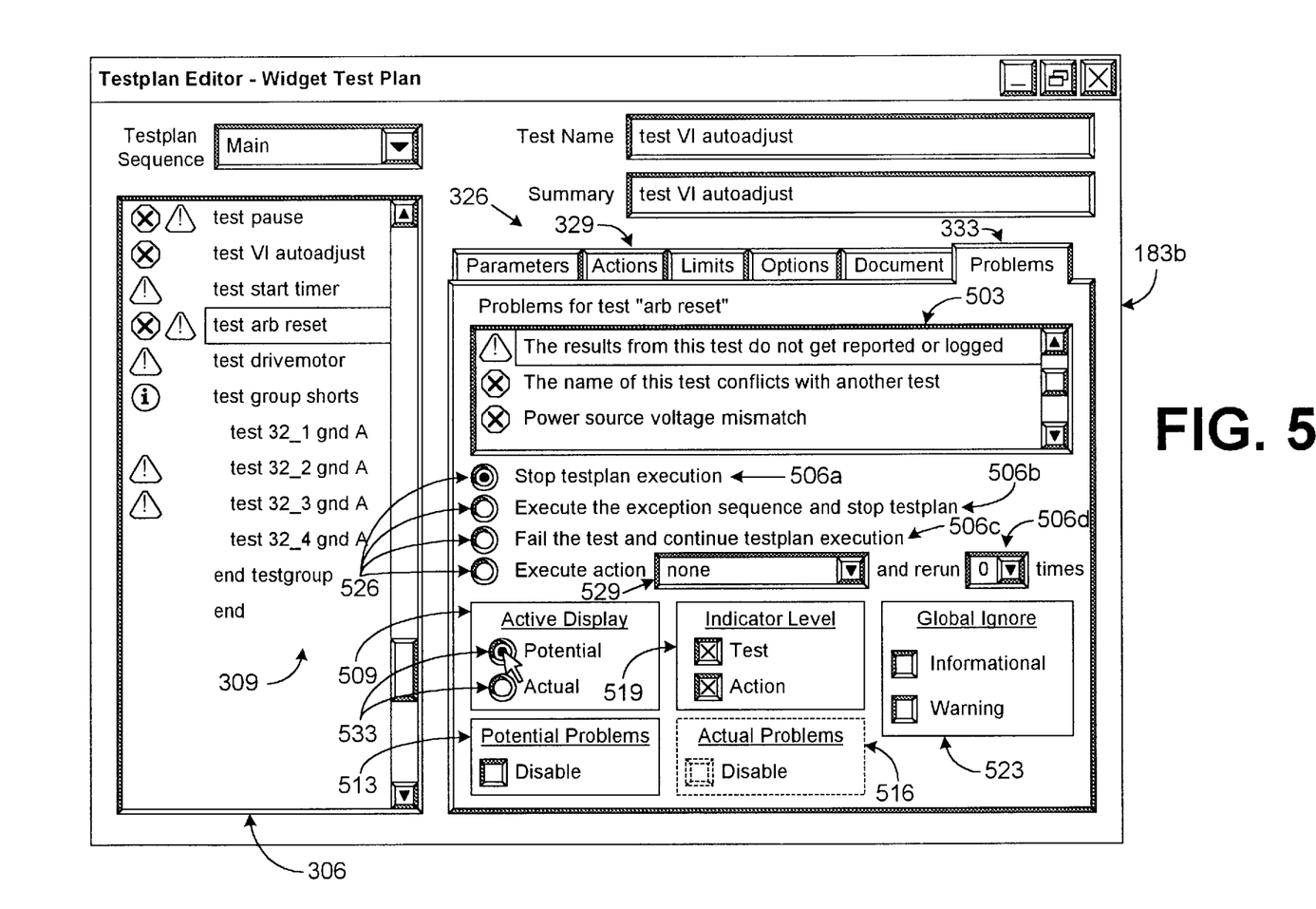
FIG. 5 is a drawing of a test plan editor interface that illustrates mechanism to manipulate setting relating to the potential and actual problems of FIG. 4B.

With reference to FIG. 5, shown is the test plan editor interface 183b in which the problems tab 333 is active thereby displaying a number of mechanisms to manipulate the settings in the test validation table 401. Under the problems tab 333 are a problem window 503, remedies 506a–d, an active display box 509, a potential problem box 513, an actual problem box 516, an indicator level box 519, and a global ignore box 523. The various boxes and remedies shown in the problems tab 333 all pertain to a particular highlighted problem in the problem window 503. The problems listed in the problem window 503 relate to the highlighted text 309 in the test sequence indication window 306. The user may highlight a particular problem in the problem window 503, for example, by clicking on that particular problem.

One of the remedies 506a–d is chosen by toggling among one of the four toggle mechanisms 526. Only one remedy 506a–d may be active at a particular time. The first remedy 506a simply stops the test plan execution upon an occurrence of the particular highlighted problem. The second remedy 506b involves the execution of an exception sequence and, thereafter, stops the execution of the test plan. The third remedy 506c involves failing a particular test and continuing the test plan execution. Finally, the fourth remedy 506d involves the execution of one or more remedy actions 529 a particular number of times as shown. The number of times a remedy action 529 is executed is adjustable. User selects the particular remedy 506a–d by clicking on one of the toggle mechanisms 526. Likewise, the remedy actions 529 executed in the fourth remedy 506d are chosen by pulling down a pick list and choosing among a number of remedy actions 529. The remedy 506a–d selected determines the setting in the test validation table 401.

For a particular highlighted test 309 in the test sequence indication window 306, either the potential or actual problems associated with that test may be displayed in the problem window 503 based upon the setting of the active display box 509. In particular, the user may manipulate toggle mechanisms 533 to display either the potential or actual problems in the problem window 503. Depending upon which toggle mechanism is triggered in the active display box 509, either the potential problem box 513 or the actual problem box 516 will be active. If the potential problems are chosen in the active display box 509, then the potential problem box 513 is active. Likewise, if the actual problems are chosen in the active display box 509, then the actual problem box 516 is active. Note that the validation logic 179 displays a particular potential or actual problem in the problem window 503 by examining the potential/actual field 406 (FIG. 4B) in the test validation table 401 (FIG. 4B).

The potential problem and actual problem boxes 513 and 516 each include a selector box that allows the user to disable a corresponding display of an associated problem indicator 323 in the test plan editor interface 183b. This is accomplished by clicking on the particular selector box in the potential and actual problem boxes 513 and 516 to disable the highlighted problem in the problem window 503. When the user clicks on the selector boxes in the potential and actual problem boxes 513 and 516, an "X" will appear therein to indicate that the particular problem is disabled. This will cause a logical 1 to appear in the local disable field 416 (FIG. 4B) of the test validation table 401 corresponding to the particular problem that is highlighted in the problem window 503.

The user may also cause the problem indicators 323 to appear in either the test sequence indication window 306 or the action window 316 by clicking on the selector boxes in the indicator level box 519 appropriately. In this manner, the user may restrict the display of the particular problem indicators 323 in one, both, or none of the locations.

Finally, the global ignore box 523 includes an informational disable selector and a warning disable selector. If the user clicks on the informational disable selector, then all informational type problems are disabled. Likewise, if the user clicks on the warning disable selector in the global ignore box 523, then all warning type problems are disabled. The clicking of the informational/warning disable selectors places a logical "1" in the global disable field 419 of the warning and informational type problems. Thus the global ignore box allows users to eliminate all informational and warning indicators 323a and 323b from view on the test plan editor interface 183b, thereby simplifying the appearance of the test plan editor interface 183b. Note that the user can not globally disable error type problems since these errors are critical to the operation of the test system.

When a particular problem is disabled either by clicking on one of the selector boxes in the potential and actual problem boxes 513 and 516, or by clicking on one of the selector boxes in the global ignore box 523, the problem indicators 323 (FIG. 3) will not appear in the test sequence indication window 306 (FIG. 3) and in the action window 316 (FIG. 3). However, indicators 323 will continue to be displayed in the problem window 503 with a different appearance. This appearance may dim the appearance of the indicators 323 or change their color, etc.

The various mechanisms discussed above allow the user to alter the settings associated with each problem in the test validation table 401 for the highlighted test in the test sequence indication window 306. Thus, a user may advantageously cater the appearance of the problem indicators 323 as well as the particular response of the testing system 100 to a particular problem. In addition, because the problems illustrated in the problem window 503 relate to the particular highlighted test in the test sequence indication window 306, a user is informed of the context in which a particular problem occurs.

Referring back to FIG. 3, the test plan editor interface 183 also includes a problem button 551 by clicking on the problem button 551 a separate dialog box is shown o a display device 133 by which the user may view all problems associated with a particular action alone that is highlighted in the action window 316.

Figure 6:
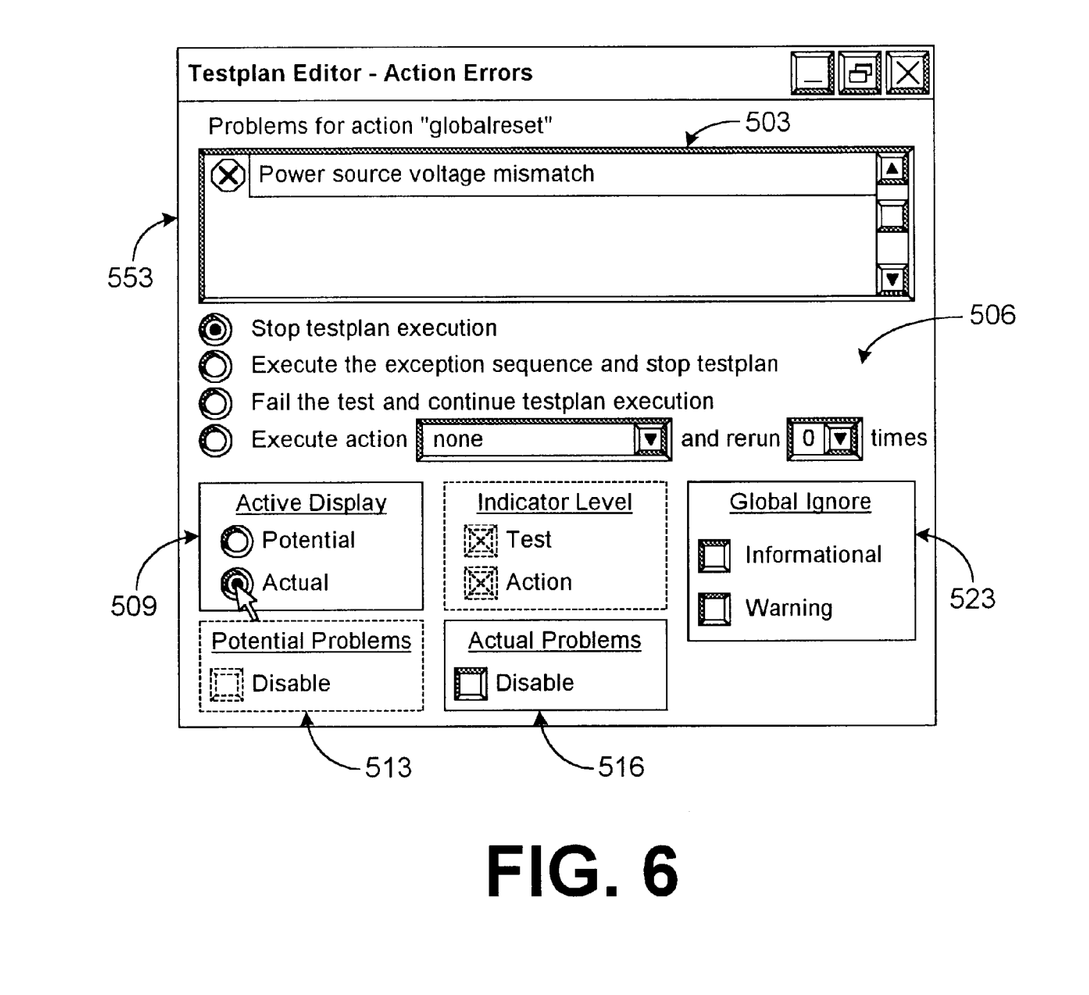
FIG. 6 is a drawing of an action problem dialog box employed in the testing system of FIG. 1.

With reference to FIG. 6, shown is the action problem dialog box 553 that is displayed upon clicking on the problem button 551 (FIG. 3). The action problem dialog box 553 includes the same mechanisms as the problems tab 333 of the test plan editor interface 183b. However, the action problem dialog box 553 differs from the problems tab 333 in that the problems displayed in the problem window 503 are associated with the particular action 313 (FIG. 3) that was highlighted in the test plan editor interface 183b when the actions tab 329 (FIG. 3) was active. The action problem dialog box 553 thus allows a user to manipulate the settings for problems relating to a specific action 313 from a test plan. Also, the particular problems are associated with a specific action and therefore the user is provided with context for each problem.

Figure 7:
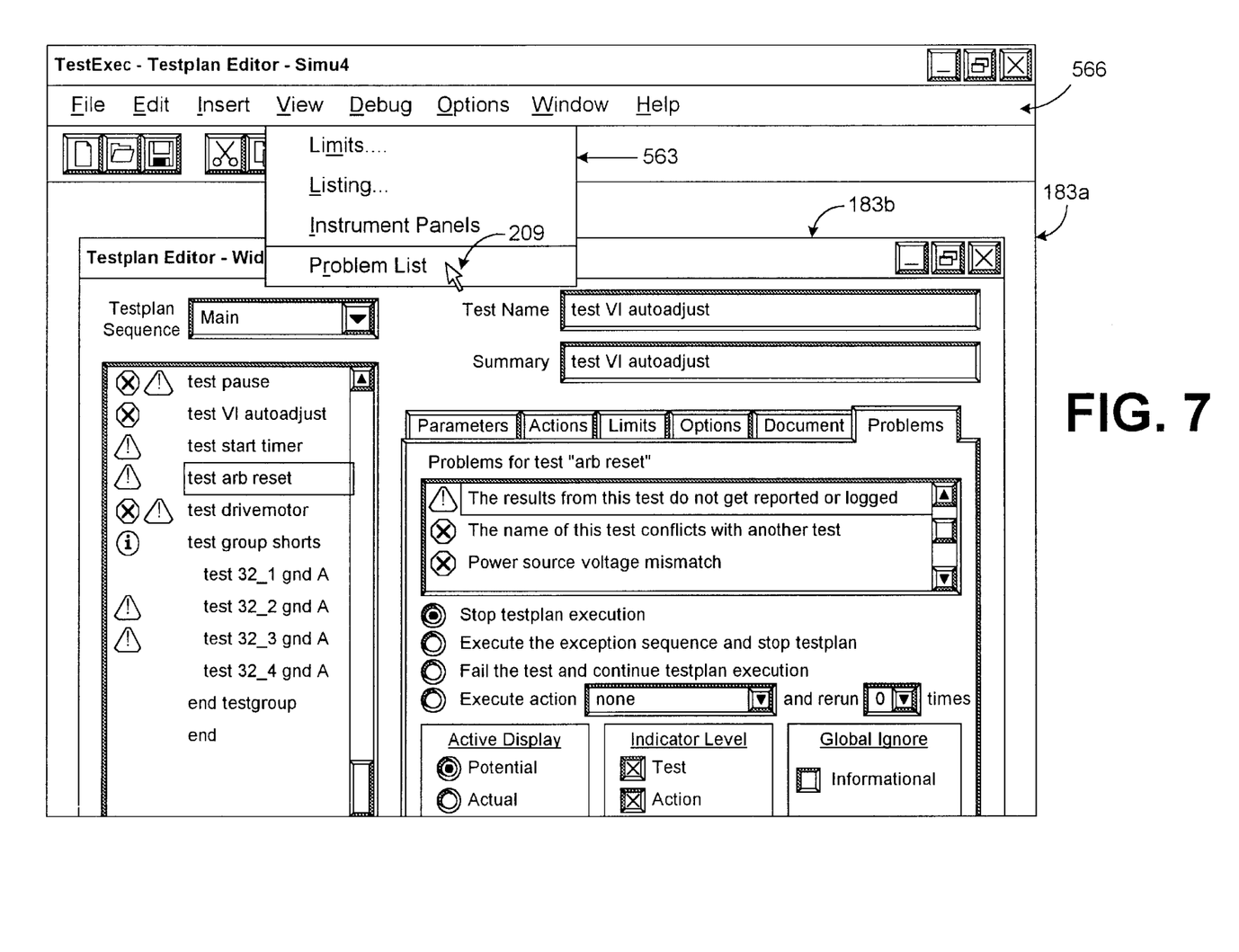
FIG. 7 is a drawing of the test executive user interface employed in the testing system of FIG. 1 that shows a problem list activation item in a pull down menu.

With reference to FIG. 7, shown is the text executive interface 183a that illustrates a pull down menu 563 that is accessed by clicking on the view selection in the menu bar 566 at the top of a test executive user interface 183a. The user may place the cursor 209 on the problem list selection of the view pull down menu 563 and click on the problem list.

Figure 8:
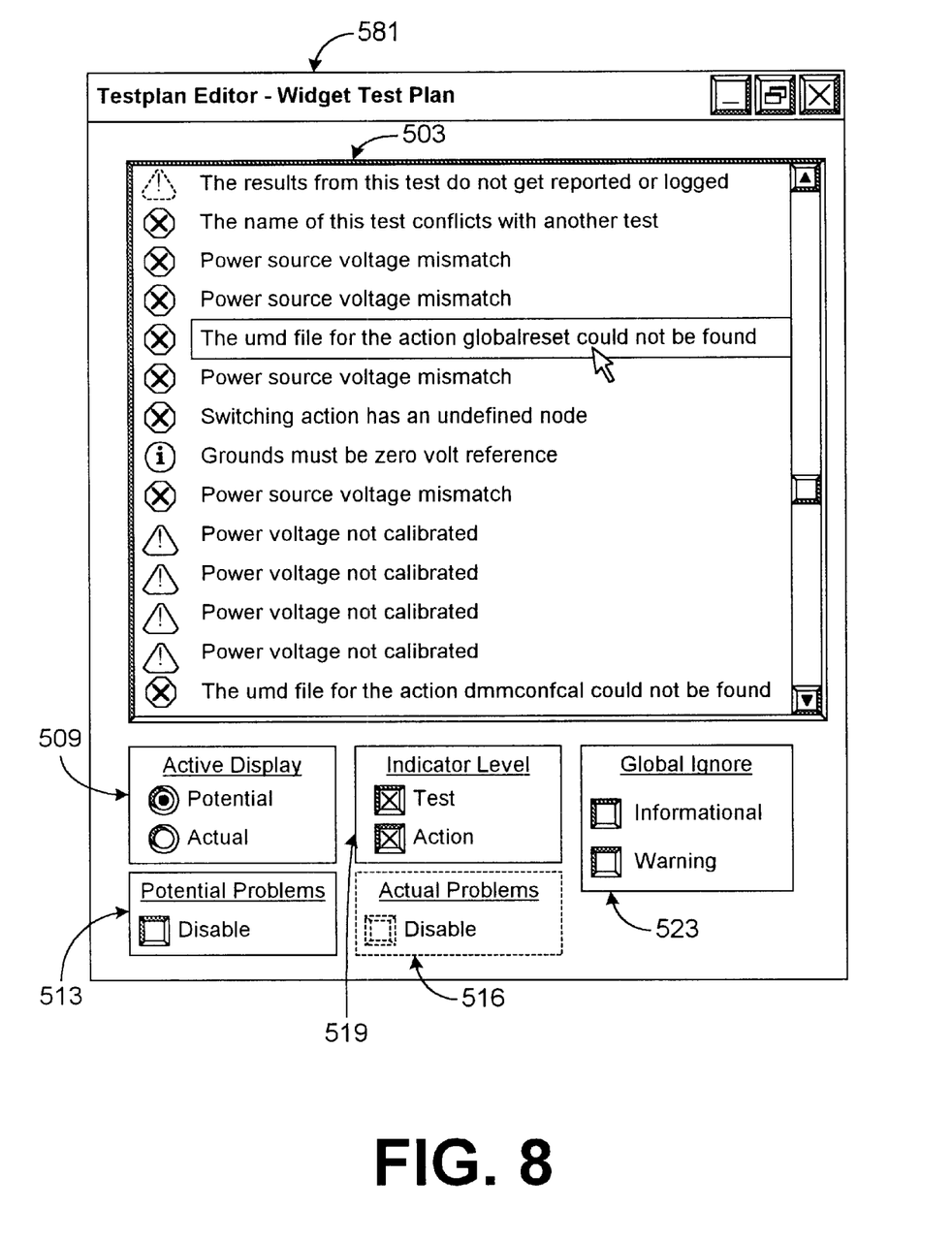
FIG. 8 is a drawing of a problem list dialog box employed in the testing system of FIG. 1.

With reference to FIG. 8, shown is a problem list dialog box 581 according to another embodiment of the present invention. The problem list dialog box 581 is activated by clicking on the problem list selection of the pull down menu 563 (FIG. 7). The problem list dialog box 581 includes a problem window 503 that lists the problems associated with the test plan sequence indicated in the test plan sequence indicator 303 (FIG. 3). The problem list dialog box 581 includes the same mechanisms to manipulate the settings of the problems in the test validation table 401 (FIG. 4B) as was described with reference to the problems tab 333 (FIG. 5) and the action problem dialog box 553 (FIG. 6).

Figure 9A:
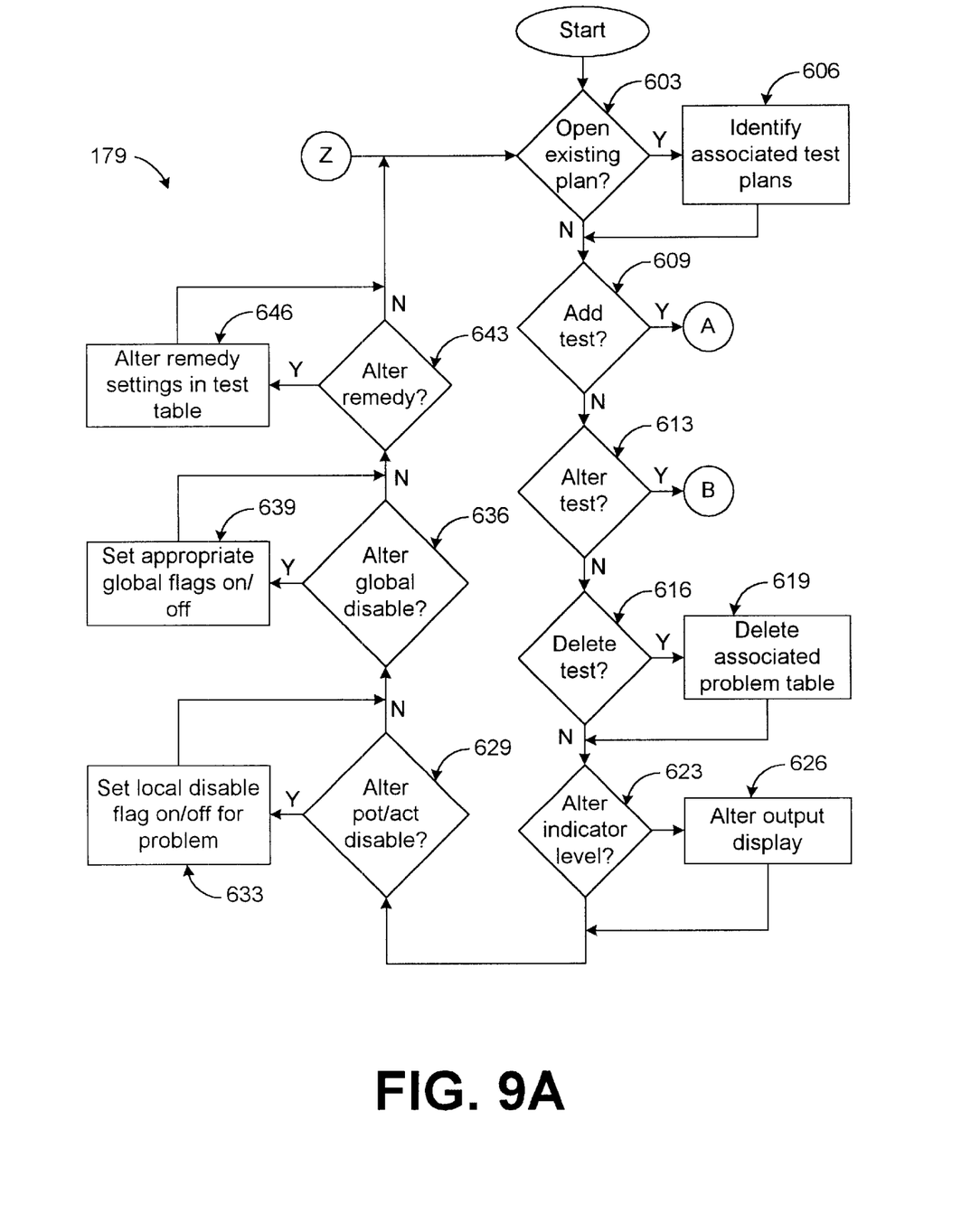
FIGS. 9A–C are flow charts of the validation logic employed in the testing system of FIG. 1.

Turning then to FIG. 9A, shown is a flow chart of the validation logic 179 according to an embodiment of the present invention. Beginning in block 603, the validation logic 179 determines whether an existing test plan has been opened. If such is the case, then the validation logic 179 progresses to block 606 in which any validation tables associated with the tests 309 (FIG. 3) in the existing test plan are identified. If there are no existing test plans opened in box 603, or after the validation table(s) 401 (FIG. 4B) are identified in block 606, then the logic 179 progresses to block 609. In block 609, the validation logic determines whether a new test has been added to the existing test plan or to a newly created test plan. If so, then the logic 179 progresses to connector A as shown. Otherwise, the logic proceeds on to block 613.

In block 613, the validation logic 179 determines whether a particular test 309 in the test plan has been altered. If so, then the validation logic 179 moves to connector B as shown. If not, then the validation logic 179 progresses on to block 616. In block 616 it is determined whether a particular test 309 in the test plan has been deleted. If so, then the validation logic 179 progresses to block 619 in which the associated test validation table 401 is deleted. If no test is deleted in block 616, or once the validation table is deleted in block 619, then the validation logic 179 proceeds to block 623.

In block 623 the logic 179 determines whether the indicator level of the problem indicators 323 (FIG. 3) has been altered via the indicator level box 519 (FIG. 5). If so, the logic 179 progresses to block 626 in which the output display interface is altered accordingly to reflect the appropriate indicator level. If there is no alteration to the indicator level, then the logic 179 moves to block 629. Once the output display 133 is altered appropriately in block 626, then the logic also progresses to block 629.

In block 629, the validation logic 179 determines whether the state of the local disable bit for a particular potential or actual problem has been altered via the potential and actual problem boxes 513 and 516 (FIG. 5). If so, then the validation logic 179 progresses to block 633 in which the local disable flag for the particular problem in the test validation table 401 is altered appropriately. If there is no alteration in block 629, or if the local disable flag is set accordingly in block 633, then the validation logic 179 progresses to block 636. In block 636, the validation logic 179 determines whether the state of a particular global disable has changed in the global ignore box 523. If so, then the logic progresses to block 639 in which the appropriate global flags are set on or off. If there has been no such change in block 636, then the validation logic 179 progresses to block 643. Likewise, once the appropriate global flags are set on or off in block 639, the validation logic 179 also progresses to block 643. In block 643 it is determined whether the state of a particular remedy 506a–d (FIG. 5) has been altered for a particular potential or actual problem. If so, then the validation logic 179 progresses to block 646 in which the remedy settings in the appropriate test validation table 401 are set accordingly. If no remedy has been altered as such in block 643 or, if the remedy settings have been altered appropriately in block 646, then the validation logic reverts back to block 603.

Figure 9B:
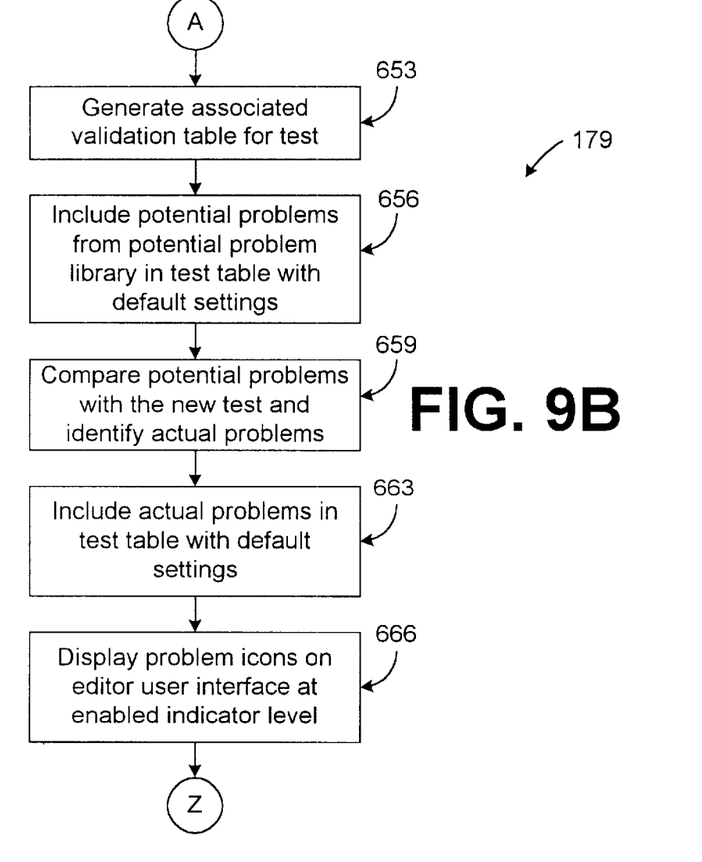

Turning then to FIG. 9B, shown is the validation logic 179 beginning at connector A. The portion of the validation logic 179 illustrated in FIG. 9B shows the functionality of the validation logic 179 in response to a newly added test 309 to the current open test plan viewed on the test plan editor interface 183b (FIG. 3). Beginning at block 653, the validation logic 179 generates a test validation table 401 (FIG. 4B) that is associated with the new test 309 to track all potential and actual problems associated with that test 309. Thereafter, in block 656, the validation logic 179 includes all potential problems pertaining to the new test 309 from the potential problem library into the new test validation table. These potential problems are placed in the new test validation table 401 with default settings.

Then, in block 659 the potential problems placed in the new validation test table 401 are compared with the new test to identify actual problems therewith. In block 663, the actual problems discovered in block 659 are included in the test validation table 401 with the appropriate default settings. Finally, in block 666, the problem indicators 323 (FIG. 3) are displayed on the test plan editor interface 183b at the enabled indicator levels to inform the user of the problems themselves. From block 666, the validation logic 179 moves on to connector Z which reverts back to block 603 (FIG. 9A).

Figure 9C:
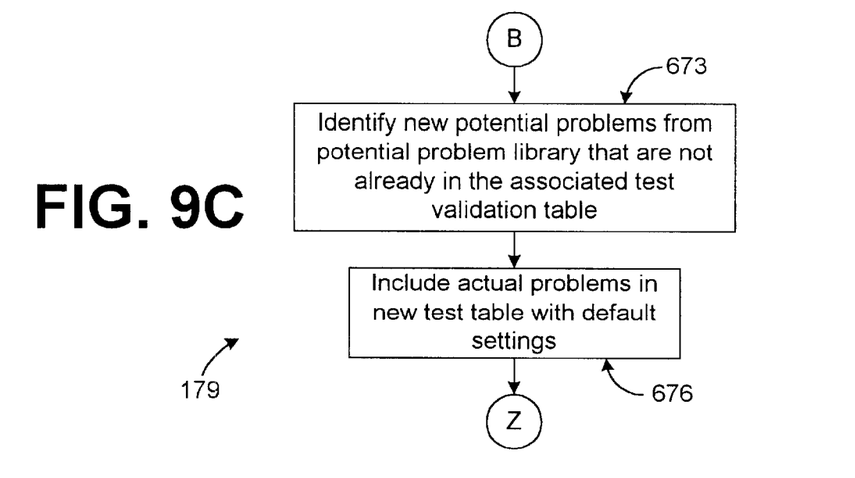

Finally, with reference to FIG. 9C, shown is the validation logic 179 that is executed in response to an alteration of a particular test in block 613 (FIG. 9A). From connector B, the validation logic 179 begins with block 673 in which any new potential problems from the potential problem library are identified that pertain to the altered test 309. Any new potential problems are then included in the associated test validation table 401. Thereafter, in block 676, any new actual problems in the altered test are identified and included in the associated test validation table 401 with default settings. Thereafter, the validation logic 179 proceeds to connector Z which reverts back to block 603 of FIG. 9A.

In addition to the foregoing discussion, the logic 179 of the present invention can be implemented in hardware, software, firmware, or a combination thereof. In the preferred embodiment(s), the logic 179 is implemented in software or firmware that is stored in a memory and that is executed by a suitable instruction execution system. If implemented in hardware, as in an alternative embodiment, the logic 179 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow charts of FIGS. 9A–C show the architecture, functionality, and operation of a possible implementation of the logic 179. In this regard, each block represents a module, segment, or portion of code, which comprises one or more executable instructions for implementing the specified logical function(s). It should also be noted that in some alternative implementations, the functions noted in the blocks may occur out of the order noted in FIGS. 9A–C. For example, two blocks shown in succession in FIGS. 9A–C may in fact be executed substantially concurrently or the blocks may sometimes be executed in the reverse order, depending upon the functionality involved.

Finally, the logic 179, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system for validating software objects in a testplan written in an object-oriented programming language by a developer using a test executive software program, the testplan configured to control hardware components to be tested by a test system, comprising:

a processor electrically coupled to a local interface;
   a memory electrically coupled to the local interface;
   validation logic stored on the memory and executed by the processor, the validation logic configured to validate a software object in a testplan written in an object-oriented programming language by a developer using a test executive software program, the testplan configured to control hardware components to be tested by a test system, the validation logic including:
   logic to detect at least one actual problem in the software object to be validated prior to execution of the software object by the test system to control a corresponding hardware component; and
   logic to display at least one problem indication corresponding to the at least one actual problem in a context of the software object.

2. The system of claim 1, wherein the problem indication is an error indication.

3. The system of claim 1, wherein the problem indication is a warning indication.

4. The system of claim 1, wherein the problem indication is an informational indication.

5. The system of claim 1, wherein the validation logic further comprises logic to specify a remedy to implement upon an occurrence of the at least one actual problem in the software object.

6. The system of claim 1, wherein the validation logic further includes:
   logic to enable display of the problem indication; and
   logic to disable display of the problem indication.

7. The system of claim 1, wherein the validation logic further includes:
   logic to identify at least one potential problem associated with the software object; and
   logic to display a potential problem indication corresponding to the at least one potential problem in a context of the software object.

8. The system of claim 7, wherein the validation logic further includes:
   logic to enable display of the potential problem indication, and
   logic to disable display of the potential problem indication.

9. The system of claim 8, wherein the validation logic further includes:
   logic to enable display of at least one problem indication based on an enabling of an associated potential problem indication; and
   logic to disable display of at least one problem indication based on a disabling of an associated potential problem indication.

10. A system for validating software objects in a testplan written in an object-oriented programming language by a developer using a test executive software program, the testplan configured to control hardware components to be tested by a test system, the system comprising:

means for detecting at least one actual problem in a software object in a testplan prior to execution of the software object by a test system, the testplan written in an object-oriented programming language by a developer using a test executive software program, the testplan configured to control hardware components to be tested by a test system; and
    means for displaying at least one problem indication corresponding to the at least one actual problem in a context of the software object.

11. The system of claim 10, further comprising means for specifying a remedy to implement upon an occurrence of the at least one actual problem in the software object.

12. A method for validating software objects in a testplan written in an object-oriented programming language by a developer using a test executive software program, the testplan configured to control hardware components to be tested by a test system, comprising the steps of:

detecting at least one actual problem in a software object in a testplan prior to execution of the software object by a test system, the testplan written in an object-oriented programming language by a developer using a test executive software program, the testplan configured to control hardware components to be tested by a test system; and
    displaying at least one problem indication corresponding to the at least one actual problem in a context of the software object.

13. The method of claim 12, wherein the step of displaying at least one problem indication corresponding to the at least one actual problem in a context of the software object further comprises the step of displaying an error indication.

14. The method of claim 12, wherein the step of displaying at least one problem indication corresponding to the at least one actual problem in a context of the software object further comprises the step of displaying a warning indication.

15. The method of claim 12, wherein the step of displaying at least one problem indication corresponding to the at least one actual problem in a context of the software object further comprises the step of displaying an informational indication.

16. The method of claim 12, further comprising the step of identifying a remedy to implement upon an occurrence of the at least one actual problem in the software object.

17. The method of claim 12, further comprising the steps of:

enabling a display of the problem indication; and disabling a display of the problem indication.

18. The method of claim 12, further comprising the steps of:

identifying at least one potential problem associated with the software object; and displaying a potential problem indication corresponding to the at least one potential problem in a context of the software object.

19. The method of claim 18, further comprising the steps of:

enabling a display of the potential problem indication; and disabling a display the potential problem indication.

20. The method of claim 19, further comprising the steps of:

enabling a display of at least one problem indication based on an enabling of an associated potential problem indication; and disabling a display of at least one problem indication based on a disabling of an associated potential problem indication.

* * * * *